United States Patent Office
2,732,375
Patented Jan. 24, 1956

2,732,375

THEBAINE DERIVATIVES AND PROCESS FOR MANUFACTURING THE SAME

Marshall D. Gates, Jr., Pittsford, N. Y., assignor to Merck & Co., Inc., Rahway, N. J., a corporation of New Jersey No Drawing. Application February 18, 1952, Serial No. 272,247

13 Claims. (Cl. 260—285)

This invention is concerned generally with phenanthrene compounds and processes of preparing the same; more particularly it relates to processes and intermediate compounds useful in the preparation of β-dihydrothebainone.

β-Dihydrothebainone which is described in J. Org. Chem. 3, 618 (1939), may be represented as follows:

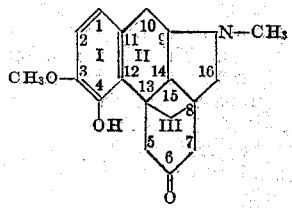

This compound is a tertiary base in which the ring fusion of rings II and III is believed to be in the transposition. β-Dihydrothebainone is useful in the synthesis of morphine alkaloids such as codeine, as is more particularly described in my copending application Serial No. 272,248, filed February 18, 1952.

It is an object of the present invention to provide a process for the preparation of β-dihydrothebainone starting with racemic β-Δ⁶-dihydrodesoxycodeine methyl ether, which may also be named 3,4-dimethoxy-N-methyl-Δ⁶-dehydroisomorphinane. It is a further object to provide a process for resolving racemic β-Δ⁶-dihydrodesoxycodeine methyl ether to obtain the optically active d and l isomers. Another object is to provide a process for converting N-methyl-Δ⁶-dehydroisomorphinane compounds to the corresponding 6-hydroxy derivatives. An additional object is to provide a process for converting d-β-Δ⁶-dihydrodesoxycodeine methyl ether to β-dihydrothebainol methyl ether. Still another object is to provide a process for preparing β-dihydrothebainol from β-dihydrothebainol methyl ether. Another object is to provide a process for oxidizing β-dihydrothebainol to β-dihydrothebainone. Other objects will be apparent from the detailed description hereinafter provided.

I have found that β-dihydrothebainone may be prepared by resolving racemic β-Δ⁶-dihydrodesoxycodeine methyl ether to obtain the d-isomer, converting this d-isomer to β-dihydrothebainol methyl ether, dimethylating the latter compound to form β-dihydrothebainol and subjecting this alcohol to oxidation. This process may be represented as follows:

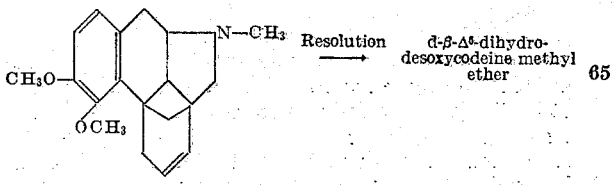

Racemic β-Δ⁶-dihydrodesoxycodeine methyl ether (3,4-dimethoxy-N-methyl-Δ⁶-dihydroisomorphinane

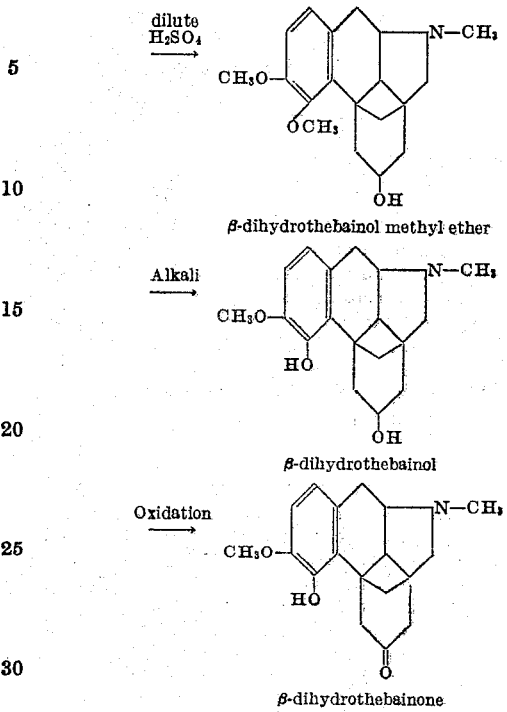

β-dihydrothebainol methyl ether

β-dihydrothebainol

β-dihydrothebainone

In accordance with one embodiment of my invention, I have found that the salts formed by reacting an optically active dibenzoyltartaric acid with racemic β-Δ⁶-dihydrodesoxycodeine methyl ether affords a convenient means of separating the entantiomorphic forms of β-Δ⁶-dihydrodesoxycodeine methyl ether since these salts have different solubility characteristics. Thus, when racemic β-Δ⁶-dihydrodesoxycodeine methyl ether is reacted with optically active dibenzoyltartaric acid in a suitable solvent medium, the resulting dibenzoyltartrate salts of the stereo isomers can be separated by their different solubilities. For example, when L(+)-dibenzoyltartaric acid is reacted with racemic β-Δ⁶-dihydrodesoxycodeine methyl ether in methanol, the L(+)-dibenzoyltartrate salt of d-β-Δ⁶-dihydrodesoxycodeine methyl ether precipitates from the solution while the L(+)-dibenzoyltartrate of l-β-Δ⁶-dihydrodesoxycodeine methyl ether remains in solution. Similarly, when D(—)-dibenzoyltartaric acid is reacted with this racemic compound in methanol solution, the D(—)-dibenzoyltartrate of l-β-Δ⁶-dihydrodesoxycodeine methyl ether precipitates from solution and the D(—)-dibenzoyltartrate of d-β-Δ⁶-dihydrodesoxycodeine methyl ether remains in solution. The dibenzoyltartrate salt thus obtained is then readily converted to the corresponding free base by the addition of an alkali in accordance with methods well known in the art.

Pursuant to a further embodiment of my invention, I have found that a 6-hydroxy substituent may be readily introduced into N-methyl-Δ⁶-dehydroisomorphinane compounds of the formula:

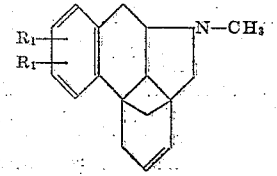

wherein R₁ represents hydrogen or an alkoxy substituent by heating with a dilute aqueous solution of sulfuric acid to form corresponding compounds of the formula:

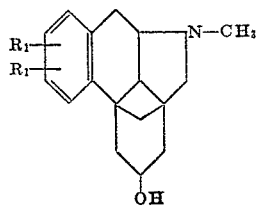

Thus, in accordance with this embodiment of my invention, when d-β-Δ⁶-dihydrodesoxycodeine methyl ether is heated with a 25% aqueous solution of sulfuric acid the corresponding 6-hydroxy compound, namely, β-dihydrothebainol methyl ether, is formed. I have found that this product is readily separated from any unreacted starting material by chromatographing the resulting products over activated alumina, and developing the alumina column with alcohol-free chloroform. The desired β-dihydrothebainol methyl ether is then recovered from the developed alumina by elution with ordinary chloroform.

In accordance with another embodiment of my invention, I have now found that β-dihydrothebainol methyl ether can be demethylated to obtain β-dihydrothebainol by reaction with alkali at elevated temperatures. This is conveniently accomplished by heating the reactants in the presence of a suitable high boiling solvent such as diethylene glycol and the like. In carrying out the demethylation in accordance with my preferred procedure, the β-dihydrothebainol methyl ether is suspended in diethylene glycol, solid potassium hydroxide and a small amount of hydrazine hydrate added, and the resulting mixture heated at about 200° C. for about 1½ hours. The demethylated product can then be recovered from the reaction mixture by dilution with water, pasing in an excess of carbon dioxide, and extracting the desired product with chloroform.

Pursuant to a final embodiment of my invention, I have found that β-dihydrothebainol can be readily oxidized to obtain β-dihydrothebainone. While various methods may be employed for effecting this oxidation, I have found that it is most conveniently accomplished by reacting the alcohol with a metal alcoholate in the presence of a ketone or an aldehyde. In accordance with a preferred embodiment of this invention, I have found that excellent yields of β-dihydrothebainone can be obtained by reacting β-dihydrothebainol with potassium tertiary butoxide in the presence of benzophenone. The reaction mixture after being refluxed to complete the oxidation is extracted with dilute hydrochloric acid. The acid extracts are then made basic with ammonia to precipitate the β-dihydrothebainone which may be further purified by methods known in the art.

The starting material, racemic β-Δ⁶-dihydrodesoxycodeine methyl ether, or 3,4-dimethoxy-N-methyl-Δ⁶-dehydroisomorphinane, may be prepared as described in my copending application Serial No. 213,287, filed February 28, 1951 or the publication in the Journal of the American Chemical Society, volume 72, page 4839 (1950).

The following examples are illustrative of the methods of carrying out my invention.

EXAMPLE 1

Resolution of racemic β-Δ⁶-dihydrodesoxycodeine methyl ether

To a methanol solution of 120 mgs. of racemic β-Δ⁶-dihydrodesoxycodeine methyl ether was added a methanol solution of 159 mgs. of L(+)-dibenzoyltartaric acid causing the precipitation of the L(+)-dibenzoyltartrate of d-β-Δ⁶-dihydrodesoxycodeine methyl ether. The precipitated product was recovered by filtration and after drying was found to weigh 88 mgs. and have a melting point of 162–163° C. A second fraction was obtained from the mother liquors and consisted of 23 mg. having a melting point of 159–160° C. A small portion of the product was purified by recrystallizing three times and dried under reduced pressure at room temperature. The L(+)-dibenzoyltartrate of d-β-Δ⁶-dihydrodesoxycodeine methyl ether thus obtained was found to melt at 162–163.5° C. and to have a rotation $[\alpha]_D^{27}+44.5°$. The melting point of this material which is a monohydrate, showed no depression when mixed with L(+)-dibenzoyltartrate of natural β-Δ⁶-dihydrodesoxycodeine methyl ether having a rotation $[\alpha]_D^{27}+48°$.

The L(+)-dibenzoyltartrate of d-β-Δ⁶-dihydrodesoxycodeine methyl ether when treated with dilute ammonium hydroxide yields the free base in the form of a colorless oil which solidified on standing and had a melting point of 41.5–42.5° C. After several recrystallizations from pentane the product was found to melt at 43.5°–44.5° C. and have a rotation $[\alpha]_D^{27}+80°$. This product showed no depression in melting point on mixing with natural β-Δ⁶-dihydrodesoxycodeine methyl ether which had a melting point of 43–44° C. and a rotation $[\alpha]_D^{27}+80°$. This natural product can also be obtained in a form having a melting point of 56–56.5° C. as can the compound prepared synthetically. The mixed melting point of these forms was likewise not depressed. The d-β-Δ⁶-dihydrodesoxycodeine methyl ether was further characterized by preparing the picrate derivative in accordance with conventional procedures. This picrate derivative was found to melt at 227.5–228.5° C. In addition, the methiodide derivative was prepared and found to have a melting point of 186.5–188° C. Neither the melting point of the picrate nor the melting point of the methiodide was depressed when mixed with the corresponding derivatives of the natural base.

In a similar fashion the synthetic salt of the l-base, namely, the D(−)-dibenzoyltartrate salt of l-β-Δ⁶-dihydrodesoxycodeine methyl ether having a melting point of 55.5–56° C. (higher form) and a rotation $[\alpha]_D^{27}+79°$ can be obtained by employing the D(−)-dibenzoyltartaric acid as the resolving agent preferably on the base recovered from the original filtrate from the preparation of separation of the L(+)-dibenzoyl tartrate.

EXAMPLE 2

Preparation of β-dihydrothebainol methyl ether 500 mgs. of d-β-Δ⁶-dihydrodesoxycodeine methyl ether having a melting point of 55.5–57° C. was heated on a steam bath for twenty-four hours in 8 cc. of 25% by weight sulfuric acid. The resulting pale yellow reaction mixture was diluted with water and ice, made basic with 10% sodium hydroxide and extracted four times with chloroform. The washed and dried chloroform solution was chromatographed on 30 g. of activated alumina using alcohol-free chloroform as the first developing solvent. In seventeen 50 cc. fractions a total of 363 mgs. of starting material was recovered. The crude product so obtained was found to melt at 54.5–56° C. and after molecular distillation was found to have a melting point of 53–56° C. The column of activated alumina was then developed further with ordinary chloroform and yielded in seven additional 50 cc. fractions a total of 114 mgs. of more strongly adsorbed material which solidified readily on scratching. A number of recrystallizations of this material from ethyl acetate yielded 13 mgs. of β-dihydrothebainol methyl ether having a melting point of 152–153° C. The melting point of this product was not depressed on mixture with natural β-dihydrothebainol methyl ether having a melting point of 152–154° C. The methiodide derivative of the β-dihydrothebainol methyl ether was prepared in accordance with conventional methods and found to melt at 243–244° C. The melting point of a mixture of this methiodide with the methiodide of natural β-dihydrothebainol was not depressed.

EXAMPLE 3

Preparation of β-dihydrothebainol 138 mgs. of β-dihydrothebainol methyl ether, melting point 150–152° C., suspended in 5 cc. of diethylene glycol and 2 cc. of 85% hydrazine hydrate was treated with 10 pellets of potassium hydroxide and a little sodium hydrosulfite. The mixture was gradually raised to 200–210° C. and held at this temperature for 1½ hours, then cooled, diluted with water containing a little hydrosulfite, carbonated to excess with carbon dioxide, and extracted four times with chloroform. The washed, dried, filtered and concentrated chloroform extracts yielded 91 mg. of colorless glass as residue. On solution of this glass in a small amount of ether and seeding with a trace of β-dihydrothebainol, 48 mg. of β-dihydrothebainol, melting point 161–164.5° C., separated, which after one further crystallization melted at 165.5–166.5° C., and did not depress the melting point of an authentic sample. Its methiodide melted at 266–268° C. and did not depress the melting point of an authentic sample.

EXAMPLE 4

Preparation of β-dihydrothebainone

Freshly-cut metallic potassium (0.2 g.) was dissolved in a mixture of 5 cc. pure dry tertiary butyl alcohol and 15 cc. of anhydrous benzene by heating, and then the excess tertiary-butyl alcohol was removed by distillation with the addition of more benzene. To this suspension was then added 303 mg. of β-dihydrothebainol, melting point 162° C., and 2 g. of benzophenone in benzene. The mixture was refluxed for 2½ hours, cooled, and extracted three times with 2N hydrochloric acid. The acid extracts were washed with ether and then made basic with ammonia. The precipitated gummy base was taken into ether, then washed, dried and concentrated to yield 230 mg. of pale yellow glass. This residue was taken into a little alcohol and treated with 25% perchloric acid to give 249 mg. of colorless perchlorate, melting point 265–268° C., dec., mixed melting point with authentic β-dihydrothebainone perchlorate undepressed. Two hundred and thirty-seven mg. of this salt was converted to the base, 182 mg., pale yellow glass. (β-dihydrothebainone is not crystalline.) Its oxime melted at 223–226° C., mixed melting point with authentic sample undepressed.

EXAMPLE 5

Preparation of N-methyl-6-hydroxyisomorphinane 0.92 g. of the hydrogen bromide salt of N-methyl-Δ⁶-dehydroisomorphinane was converted to the oily base, which was heated at about 95° C. in 25% sulfuric acid (20 cc.) for 54 hours. The light yellow solution was then poured onto cracked ice, made alkaline with potassium hydroxide and extracted into chloroform. Evaporation of the solvent gave a viscous oil which was chromatographed on 30 g. of acid-washed alumina. Seven 75 cc. fractions of ether eluate removed about 100 mgs. of starting material. In 175 cc. of chloroform eluate there was found a base which precipitated as the hydrogen bromide salt, melting point 160–190° C. Further stripping with 4×75 cc. portions of methanol gave additional material, M. P. of hydrogen bromine salt 175–190° C. Since purification of the salt was not readily achieved, the material was converted back to base and sublimed at 150° C. There was collected 0.33 g. of N-methyl-6-hydroxyisomorphinane, M. P. 50–55° C.

*Analysis.*—C. 79.36; H. 9.00. Found: C. 79.17; H. 9.03. Infra red absorption spectrum indicates the presence of a hydroxyl group.

Various changes and modifications in the foregoing procedures will occur to those versed in the art, and to the extent that such changes and modifications are within the purview of the appended claims, it is to be understood that they constitute part of my invention.

I claim:
1. The process which comprises reacting an N-methyl-Δ⁶-dehydroisomorphinane compound of the formula:

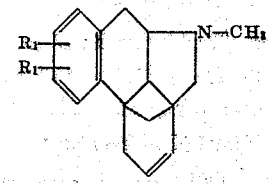

wherein $R_1$ is a member selected from the group consisting of hydrogen and alkoxy, with dilute sulfuric acid to form a compound of the formula:

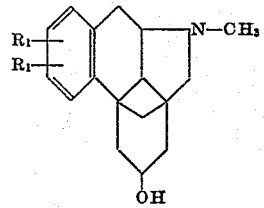

2. The process which comprises heating d-β-Δ⁶-dihydrodesoxycodeine methyl ether with dilute sulfuric acid to form β-dihydrothebainol methyl ether.

3. The process which comprises reacting β-dihydrothebainol methyl ether with an alkali in the presence of a high boiling solvent at elevated temperatures to form β-dihydrothebainol.

4. The process which comprises reacting β-dihydrothebainol methyl ether with potassium hydroxide and hydrazine hydrate in diethylene glycol at elevated temperatures to form β-dihydrothebainol.

5. The process which comprises subjecting β-dihydrothebainol to oxidation to form β-dihydrothebainone.

6. The process which comprises reacting β-dihydrothebainol with potassium tertiary butoxide and benzophenone to form β-dihydrothebainone.

7. The process for preparing β-dihydrothebainone which comprises resolving racemic β-Δ⁶-dihydrodesoxycodeine methyl ether to obtain the d-stereo isomer, heating said d-stereo isomer with dilute sulfuric acid to form β-dihydrothebainol methyl ether, demethylating said ether by heating with alkali to form β-dihydrothebainol, and oxidizing the latter product to form β-dihydrothebainone.

8. The process for preparing β-dihydrothebainone which comprises reacting racemic β-Δ⁶-dihydrodesoxycodeine methyl ether with L(+)-dibenzoyltartaric acid and separating the L(+)-dibenzoyltartrate salt of d-β-Δ⁶-dihydrodesoxycodeine methyl ether, neutralizing said dibenzoyltartrate salt with ammonia to obtain the free base, heating said free base with a dilute aqueous solution of sulfuric acid to form β-dihydrothebainol methyl ether, heating said ether with potassium hydroxide and hydrazine hydrate in diethylene glycol to form β-dihydrothebainol, and treating the latter compound with potassium tertiary butoxide in the presence of benzophenone to form β-dihydrothebainone.

9. The process which comprises reacting β-dihydrothebainol methyl ether with potassium hydroxide in the presence of hydrazine hydrate in diethylene glycol at a temperature of about 200° C., and recovering β-dihydrothebainol from the resulting reaction mixture.

10. The process which comprises reacting β-dihydrothebainol methyl ether with an alkali metal hydroxide and hydrazine in a high boiling solvent at elevated temperatures to form β-dihydrothebainol.

11. The process which comprises reacting β-dihydrothebainol with a metal alcoholate in the presence of an aldehyde to produce β-dihydrothebainone.

12. The process which comprises reacting β-dihydrothebainol with a metal alcoholate in the presence of a ketone to produce β-dihydrothebainone.

13. The process which comprises heating β-dihydrothebainol with potassium tertiary butoxide and benzophenone in benzene, and recovering β-dihydrothebainone from the resulting reaction mixture.

References Cited in the file of this patent

UNITED STATES PATENTS

| | | |
|---|---|---|
| 2,524,855 | Schneider et al. | Oct. 10, 1950 |

FOREIGN PATENTS

| | | |
|---|---|---|
| 498,660 | Belgium | Feb. 1, 1951 |

OTHER REFERENCES

Small et al.: J. A. C. S., vol. 53, pp. 2214–43 (1931).
Doering et al.: JACS, vol. 69, pp. 1700–10 (1947).
Rapoport et al.: J. Org. Chem., vol. 15, pp. 1103–07 (1950).
Fieser et al.: Org. Chem. (D. C. Heath and Co., Boston; 1944), pp. 270–74.
Gates: JACS, vol. 72, pp. 4839–40 (1950).